Dec. 19, 1967 T. KORN 3,358,390
PROCESS AND APPARATUS FOR TEACHING INTENDED TO
PERMIT OBJECTIVE HEARING OF ONE'S OWN WORDS
Filed Oct. 13, 1964 3 Sheets-Sheet 1
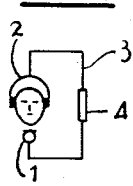
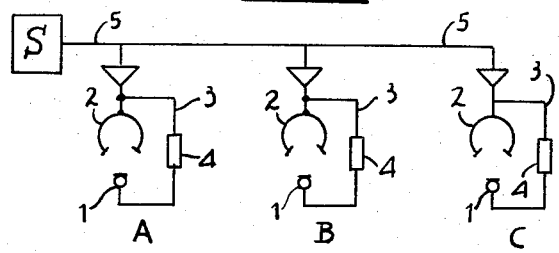
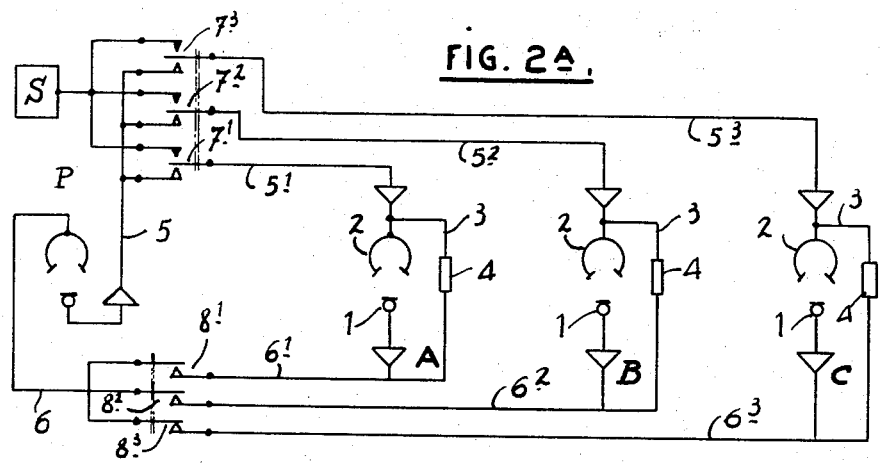
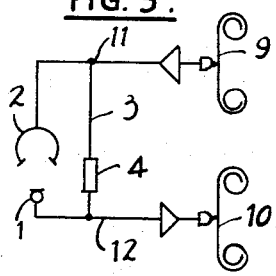
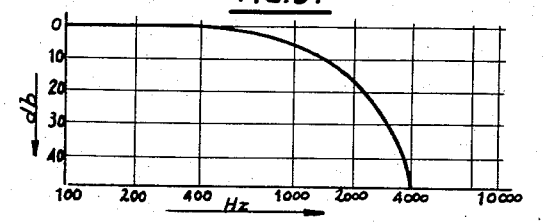
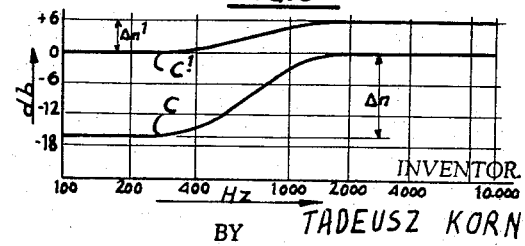
INVENTOR.
BY TADEUSZ KORN

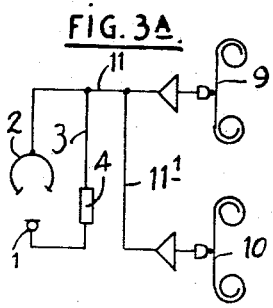
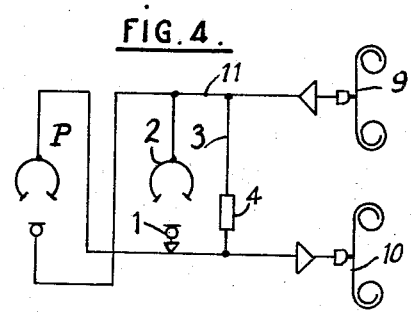
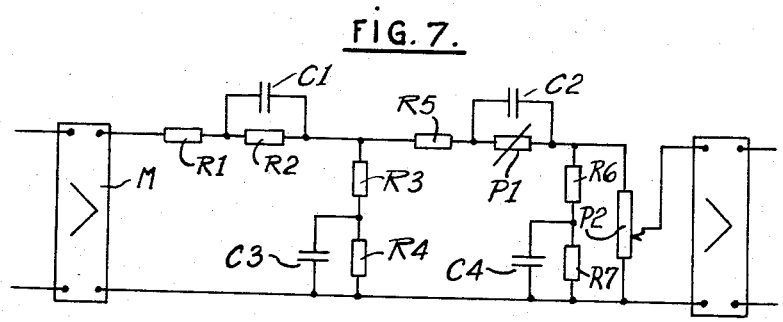

INVENTOR.
TADEUSZ KORN

United States Patent Office 3,358,390
Patented Dec. 19, 1967

3,358,390
PROCESS AND APPARATUS FOR TEACHING INTENDED TO PERMIT OBJECTIVE HEARING OF ONE'S OWN WORDS
Tadeusz Korn, 58 Rue Mercelis, Brussels, Belgium
Filed Oct. 13, 1964, Ser. No. 403,559
Claims priority, application Belgium, Oct. 14, 1963, 638,599
8 Claims. (Cl. 35—35)

The present invention relates to a process and to apparatus for teaching machines intended to permit the objective and simultaneous hearing of one's own words.

The chief application and use of this is in the teaching of foreign languages.

It is well known that when speaking normally one hears one's own words in a different manner than one hears other people in conversation. This is due to the fact that one hears one's own voice simultaneously by two acoustic channels: in the first place by an external aerial route between the mouth and the ears and secondly by internal conduction between the vocal and auditive organs. As the transmission characteristic (response curves) of this latter route is totally different from that of the aerial route, the combination of sounds transmitted by internal conduction combined with the directive effect of the relative positions of the mouth and the ears, completely deforms the tonality of self-hearing relative to objective hearing.

This phenomenon is confirmed in everyday life by the well known fact that anybody who hears one's own voice from a recording, with objective tonality, finds it unrecognisable in comparison with the sounds he is accustomed to hear when self-listening normally to himself.

The distortion of tonality in self-listening is the major cause of the well known difficulties experienced in acquiring good pronounciation while learning a foreign language.

This distortion makes it difficult for the pupil to compare his own words with those of a teacher which reach him with objective tonality.

Attempts have been made to remedy these difficulties with many devices for phonetic correction, but all these known devices have proved to be of little efficiency.

A known device called "audio-active" makes use of a microphone placed in front of the mouth of the pupil and joined, by means of an amplifier, to receivers placed on the pupil's ears. Thus the sounds transmitted with objective tonality are reenforced and the intervention of other acoustic routes is somewhat reduced. Nevertheless, this last factor still remains predominant and the improvement obtained is not sufficient to provide the true objective tonality for self-hearing.

Some known audio-active devices provide tone controls but the characteristics of the latter, making use of general sound techniques, does not bring about good objectivity in self-hearing.

Other known audio-active devices, intended above all for the re-education of pathological cases, are provided with selective filters isolating certain frequency bands. Their intention is to stimulate artificially the emission of certain components of the words or the voice and the characteristics of the filters used have no connection with the problem of internal conduction.

Other solutions involve the use of cheap audio-active devices making use of purely mechanical means, such as acoustical reflectors, tubes, and the like. However, their principal aim is to provide merely a simple amplification of the external path without any consideration for the transmission characteristic of the device.

Yet another known means of phonetic correction is based upon the recording of the words of the pupil on magnetic tape with consecutive reproduction. This system ensures that the pupil hears his words with absolutely objective tonality but unfortunately there is a delay in time and thus it is more useful in ascertaining the faults committed than to facilitate instantaneous imitation of the pronunciation of the teacher.

The object of the device according to the present invention is to bring about the physical conditions for self-hearing with objective tonality, in other words, to equalize the distortions produced by the internal conduction and other paths, such as acoustical leakages and acoustical transparence of the receivers.

In the following, the expression "parasitic conduction" is intended to mean the total of the internal conduction and the acoustic paths mentioned above.

According to the present invention this object is achieved by leading to the ears of the pupil, his own voice captured by a microphone, amplified and corrected by a transmission device whose characteristics are the inverse of those of the parasitic conductance.

Thus, the corrective device transmits, with an adequate gain, the complement of the sounds which are attenuated in parasitic conduction.

Consequently, the proportional addition of two signals, one distorted by parasitic conduction and the other adjusted by the proposed device, gives the total characteristics for the self-hearing very close to those of pure aerial transmission between two subjects.

The major difficulty in designing the equalizing device is that the characteristics of the parasitic conduction between the human vocal and auditory organs seems, at first sight, to be inaccessible to any physical measurement. However, this measurement can be made by the method according to the present invention.

The invention method is based on the substitution, for parasitic conduction, of a physical circuit which is easily measured by objective means, and the method can be summarized as follows:

The subject is invited first to record his voice with the aid of a microphone and a high-fidelity tape recorder. This recording takes the form of short sentences, words or separate phonemes, followed by periods of silence of equal length.

Then the subject hears, through a head phone, the reproduction of the recording while he repeats the same text during each period of silence, this time without the microphone. In this way he hears his own voice placed in succession, once with objective tonality and once parasitic conduction.

Between the tape recorder and the headphone there is inserted a filter whose response curve can be adjusted at will.

The subject is asked to adjust this filter in order to modify the tonality of the sounds reproduced by the tape recorder so as to make them correspond, as near as possible, to that which he hears during his repetitions. The response curve of the adjustable filter, thus established, is easily measured by physical means and represents the characteristic of the parasitic conduction.

As an obsolutely non-limiting indication, certain results of measurements obtained by this method are set out below.

It has been found that the parasitic conduction transmits chiefly low frequencies and that medium and higher frequency sounds are progressively attenuated starting from about 300 Hz. This attenuation already exceeds 10 decibels at frequencies of 1600 Hz., reaching several tens of decibels at a frequency of 4000 Hz.

It is evident that this attenuation depends upon the mechanical characteristics of the receivers that are used. Thus the measurement of the parasitic conduction must be made with the same type of receivers as those envisaged with the correction device.

These results provide an important idea about the deformation brought about by parasitic conduction and explain the disastrous effect that the latter produces in self-hearing by pupils. One also sees why the known audio-active devices, based upon simple amplification at a tolerable level cannot equalize the distortions of the parasitic conduction. The object of the present invention is distinguished essentially in that the voice is led to the ears by a corrective transmission device having a response curve which compensates for that of the parasitic conduction, that is to say it provides the complement of sounds which are attenuated by this conduction and consequently provides self-hearing with objective tonality.

FIG. 1 is a somewhat schematic diagram illustrating the principle of the invention correcting device with an equalizing filter;

FIGS. 2 and 2A are schematic diagrams of plural devices according to FIG. 1 connectable to a common sound source or standard voice and illustrating switching devices operable by the instructor;

FIGS. 3, 3A and 4 are views, corresponding to FIGS. 1, 2 and 2A, illustrating the pupil's apparatus as including a two-track recorder;

FIG. 5 is a graphic illustration of the frequency response of the human parasitic sound conduction as measured by the method of the present invention;

FIG. 6 is a graphic illustration of the frequency response curves of the equalizing device of the invention at different listening levels;

FIG. 7 is a schematic wiring diagram of an equalizing device having the frequency response curve shown in FIG. 6;

Figure 8:
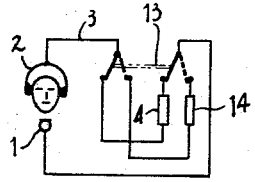
FIG. 8 is a schematic illustration, generally similar to FIG. 1, but further illustrating a filter and a switch for providing natural self-listening conditions.

In principle, the device providing objective self-hearing conditions according to the invention comprises (FIG. 1) a microphone 1 placed in front of the pupil's mouth and headphones 2 linked to the microphone by the electric line 3.

The correcting transmission device having a characteristic compensating for those of parasitic conduction is indicated at 4 on the electric line 3.

FIGURE 2 represents an example of a scholastic installation which comprises a certain number of devices A.B.C. for different pupils and linked by a conductor 5 to a common source of a model text S which is, for example, a tape recorder, a record player, or a microphone for the teacher.

Pupils provided with devices according to FIGURE 1 hear the model text coming directly to their headphones through the electric line 5. On the other hand, each pupil hears his own voice picked up by the microphone and led to his headphone by the corrective transmission device 4. This, in conjunction with the parasitic conduction, lets him hear his own voice with objective tonality. Therefore when repeating the model phrases the pupil can immediately compare his own pronounciation with that of the teacher, both of them in objective tonality.

If the installation provides for intercommunication facilities (FIG. 2A), the voice of each pupil is transmitted directly to the instructor to line 6, that is to say without passing through the corrective transmission device 4. On the other hand, the voice of the teacher is also transmitted to each pupil without passing through a device 4, for example, by the same line 5 as the model text. In FIG. 2A, the desk P of the teacher is equipped with keys 7 and 8 permitting the teacher to enter into communication with each of his pupils without his voice passing through the corrective devices.

Another embodiment, shown in FIGS. 3, 3A and 4, is one in which use is made of individual two-track tape recorder for each pupil.

In these installations, whose general principle is known, each pupil has an individual source of text recorded on the upper track of a magnetic tape 9 (FIG. 3). Under working conditions the pupil hears the model text by means of a line 11 and headphone 2 and records his voice by microphone 1 and line 12 on the lower track 10. In the known devices, during recording, the pupil hears his own voice amplified and led to his headphone by means of his own microphone.

According to the invention (FIG. 3) the pupil hears the upper track 9 directly, records his voice on the lower track 10, also directly, but during his recording he hears his own voice by means of the corrective device 4, in a true objective tonality. The pupil can afterwards switch over the tape recorder and hear the reproduction of both tracks without passing through the corrective device 4, and, in this case, an arrangement such as that of FIG. 3A is used.

FIG. 4 shows the same student's equipment as shown in FIG. 3, but in connection with the instructor. In FIG. 4 also, the corrective device 4 works only in the circuit connecting the student's microphone 1 to the student's headphones 2. It will be apparent that any other different technique, based on the same principles such as, for example, putting the corrective device 4 in the microphone 1 or receivers with devices of inverse characteristics in the "direct" communication circuits, are included within the scope of the present invention.

The corrective device has the response curve C (FIG. 6) giving a constant gain at high frequencies beginning around 1600 Hz., but decreasing progressively towards low frequencies around 300 Hz. to maintain constant gain below this last frequency. The difference ($\Delta n$) between the levels of low frequencies below 300 Hz. and high frequencies above 1600 Hz. will depend upon the level desired by the self-listener. Given that the transfer function of parasitic conduction (FIG. 5) remains constant, listening at low levels demands that the corrective device transmits only the medium and high frequencies attenuated in parasitic conduction.

In many cases, however, where it may be necessary to ensure a higher self-listening level, the corrective device must transmit not only the high frequencies but also the complement of low frequencies, which, together with those transmitted by parasitic conduction, equal the level at high frequencies. In other words the proportion of the high to low frequencies ($\Delta n$) transmitted by the corrective device 4 must vary accordingly to the general gain of the device and the curve C becomes the curve $C_1$.

The corrective device can therefore be provided with a special adjustment permitting variation in the dosage of high and low frequencies following the general level of self-hearing. This last control can be joined directly with the gain control, for example using a double potentiometer with a single control.

FIGURE 5 represents a typical characteristic (response curve) of parasitic conduction of a subject fitted with a typical headphone, and FIGURE 6 represents the ground characteristics of the corresponding corrective device. A practical non-limiting example of a corrective device using resistors and capacitors is shown in FIG. 7.

The signal coming from the pupil's microphone passes, after preliminary amplification (at M), to the correction circuit composed of resistors R and capacitors C. At low frequencies, this circuit works as two voltage dividers in cascade, composed, respectively, of resistors $$(R_1+R_2)-(R_3+R_4)$$

and $(R_5+P_1)-(R_6+R_7)$. This insures constant gain as long as the reactance of bypass condensers $C_1$ and $C_2$ is large in comparison with the values of resistors $R_2$ and $P_1$. At high frequencies, this reactance is small, so the voltage dividers are reduced to $R_1-(R_3+R_4)$ and $R_5 - (R_6 + R_7)$, which again assures constant gain of the device but at a level higher than at low frequencies.

The difference of level ($\Delta n$) between these two ranges of frequency is adjustable with the aid of the variable resistor $P_1$, and can vary between 15 and 6 db. Potentiometer $P_2$ controls the general gain and can, if desired, be mechanically linked with variable resistor $P_1$ so that the increase in the general gain is linked with a reduction in the value of the resistance at $P_1$, and consequently, the reduction in the difference of the level ($\Delta n$).

According to the curve shown in FIG. 6, the bypass condensers $C_3$ and $C_4$ are not essential for the device, but they can be used in order to reinforce the lowest frequencies usually missing in the response of the average microphones and headphones.

During phonetic exercises it is necessary that the pupil should be able to transfer quickly from corrected self-hearing to natural self-hearing. Using the electrical device (FIGS. 2, 3 and 4) the pupil must carry headphones in order to maintain contact with the rest of the device and with the teacher.

For this purpose, the present invention provides a switch permitting branching, in the circuit "microphone-receiver" for each pupil, either with the self-hearing corrective device according to the previous description or with another device whose response curve, together with that of the internal parasitic conduction, as hereinbefore defined, provides the pupil with resultant hearing conditions equivalent to those of natural self-hearing, i.e. with neither headphones nor microphones.

To provide these conditions, a filter can be used to attenuate the high frequencies in the channel connecting the microphone and the headphones. This attenuation must be larger at a high listening level than at a lower listening level or, in other words, it must vary with a general gain control.

FIGURE 8 represents the principle of the invention with a switch 13 permitting transfer from the device for objective self-hearing 4 to that for natural self-hearing 14.

Figure 9:
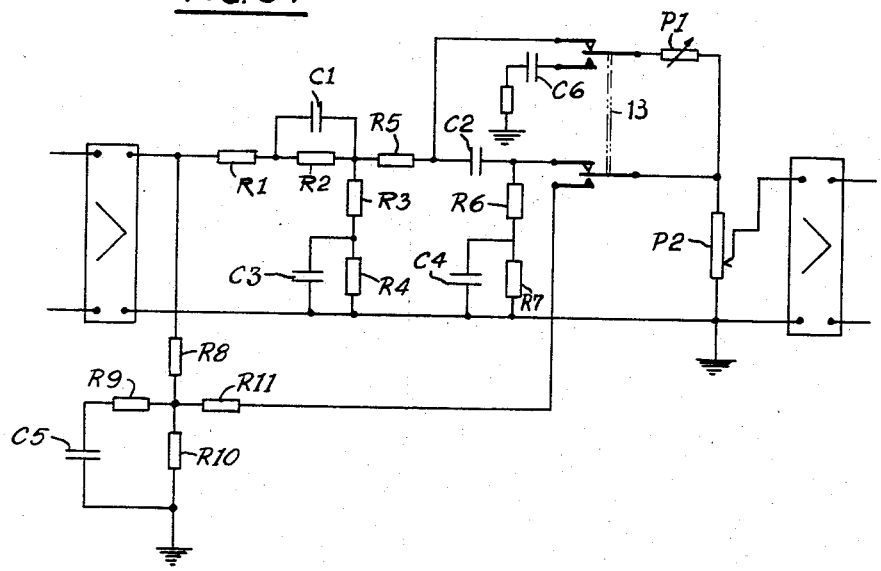
FIG. 9 is a schematic wiring diagram corresponding to FIG. 8.

FIGURE 9 illustrates a non-limiting example of a complete circuit with switch 13, an objective self-hearing device as in FIG. 7, and a second filter 14 composed of resistors $R_8$–$R_{12}$ and capacitors $C_5$–$C_6$. The latter circuit is, essentially, a well known low-pass filter whose degree of attenuation is varied by means of resistor $P_1$ coupled to the volume control $P_2$.

While specific embodiments of the invention have been shown and described in detail to illustrate the application of the principles of the invention, it will be understood that the invention may be embodied otherwise without departing from such principles.

What I claim is:

1. A teaching aid, providing objective hearing of one's own voice, comprising, in combination, a sound input means for receiving a person's spoken sounds; a sound output means for delivering said spoken sounds to the same person's ear; sound transmission means interconnecting said input means and said output means; and a sound corrective device included in said transmission means and transmitting high frequencies with substantially uniform gain above 1600 Hz. and progressively attenuating lower frequencies between 1600 and 300 Hz. to an extent sufficient to attain, below 300 Hz., a predetermined attenuation as compared with the level at higher frequencies.

2. A teaching aid, as claimed in claim 1, including gain adjustment means for said sound corrective device; frequency attenuation adjustment means for said sound corrective device; and a common control operatively associated with said gain adjustment means and said attenuation adjustment means and operable to decrease the attenuation adjustment in accordance with increase in the gain, whereby the sum of the lower frequencies providing by parasitic conduction and the lower frequencies transmitted by said device remain substantially equal to the transmission level of the higher frequencies.

3. A teaching aid, as claimed in claim 2, in which said sound in put means comprises a microphone positioned in front of the person's mouth, said sound output means comprises at least one headphone placed on the person's ear, and said sound transmission means comprises electrical means interconnecting said microphone and said headphone; said sound corrective device comprising a transmission correcting device having a response curve compensating that of the parasitic conduction of the person's head.

4. A teaching aid, as claimed in claim 3, including a low-pass filter forming part of said transmission means, said low-pass filter having a frequency attenuation characteristic which, in conjunction with the parasitic conduction, provides the natural conditions of self-hearing; said control means being connected to said filter and varying the attenuation thereof inversely with the adjustment of the gain of said corrective device; and switch means selectively operable to connect either said transmission correcting device or said filter between said microphone and said headphone.

5. A teaching system comprising plural teaching aids as claimed in claim 3, each arranged at a respective pupil's post; a source of model oral text common to all of said pupil's posts; a teacher's control post having a teacher's microphone and a teacher's headphone; first switch means selectively operable to connect said source of model oral text or said teacher's microphone directly to all of the headphones at said pupil's posts in bypassing relation to the respective transmission correcting devices at said pupil's posts; and second switch means selectively operable to connect said teacher's headphone directly to the microphones at said pupil's posts in bypassing relation to the transmission correcting devices at said pupil's posts.

6. A teaching system comprising plural teaching aids as claimed in claim 4, each arranged at a respective pupil's post; a source of model oral text common to all of said pupil's posts; a teacher's control post having a teacher's microphone and a teacher's headphone; first switch means selectively operable to connect said source of model oral text or said teacher's microphone directly to all of the headphones at said pupil's posts in bypassing relation to the respective transmission correcting devices at said pupil's posts; and second switch means selectively operable to connect said teacher's headphone directly to the microphones at said pupil's posts in bypassing relation to the transmission correcting devices at said pupil's posts.

7. A teaching system including plural teaching aids, as claimed in claim 3, each arranged at a respective pupil's post; plural sound recorders, each at a respective pupil's post, each recorder including first and second sound tracks; said first tracks having a model oral text recorded thereon; sound reproducing means connecting each first track directly to the headphone at the respective pupil's post in bypassing relation with the respective transmission correcting device; sound recording and reproducing means connecting said second track of each recorder to the respective microphone and, through the respective transmission correcting device, to the respective headphone at each pupil's post; a teacher's post including a teacher's microphone and a teacher's headphone; means connecting said teacher's microphone directly to the headphone at each pupil's post in bypassing relation to the respective transmission correcting device thereat; and means connecting the microphones at said pupil's post directly to said teacher's headphone in bypassing relation with the respective transmission correcting devices.

8. A teaching system including plural teaching aids, as claimed in claim 4, each arranged at a respective pupil's post; plural sound recorders, each at a respective pupil's post, each recorder including first and second sound tracks; said first tracks having a model oral text recorded thereon; sound reproducing means connecting each first track directly to the headphone at the respective pupil's post in bypassing relation with the respective transmission correcting device; sound recording and reproducing means connecting said second track on each recorder to the respective microphone and, through the respective transmission correcting device, to the respective headphone at each pupil's post; a teacher's post including a teacher's microphone and a teacher's headphone; means connecting said teacher's microphone directly to the headphone at each puipl's post in bypassing relation to the respective transmission correcting device thereat; and means connecting the microphones at said pupil's post directly to said teacher's headphone in bypassing relation with the respective transmission correcting devices.

References Cited

UNITED STATES PATENTS

| 3,098,307 | 7/1963 | Caldwell | 35—35.3 |
| 3,167,871 | 2/1965 | Brooks | 35—35.3 |

FOREIGN PATENTS

| 214,420 | 7/1941 | Switzerland. |
| 239,781 | 3/1946 | Switzerland. |

EUGENE R. CAPOZIO, *Primary Examiner.*

W. GRIEB, *Assistant Examiner.*